United States Patent [19]

Pirc

[11] Patent Number: 4,842,084

[45] Date of Patent: Jun. 27, 1989

[54] LOCKING MECHANISM FOR A WEIGHING SCALE TRAY

[75] Inventor: Vladimir V. Pirc, Norwalk, Conn.

[73] Assignee: Pitney Bowes Inc., Stamford, Conn.

[21] Appl. No.: 290,348

[22] Filed: Dec. 29, 1988

[51] Int. Cl.[4] .................... G01G 19/00; G01G 23/02; G01G 3/14

[52] U.S. Cl. .................................. 177/145; 177/154; 177/210 FP

[58] Field of Search ................. 177/145, 154, 210 FP

[56] References Cited

U.S. PATENT DOCUMENTS

| | | | |
|---|---|---|---|
| 2,597,069 | 5/1952 | Conti | 177/145 X |
| 2,707,630 | 5/1955 | Molins | 177/145 X |
| 4,370,888 | 2/1983 | Popper | 177/210 FP |

Primary Examiner—George H. Miller, Jr.
Attorney, Agent, or Firm—Peter Vrahotes; Melvin J. Scolnick; David E. Pitchenik

[57] ABSTRACT

A locking mechanism for securing the tray of a scale during the transporting of flat articles, such as envelopes, onto and across the tray of the scale. When a flat has been placed in a position for weighing, the conveying mechanism is put into an inoperative mode and causes the locking mechanism to release the tray. After the article is weighed, the conveying mechanism is placed into the operating mode and acts upon the locking mechanism to cause it to once more secure the tray.

8 Claims, 5 Drawing Sheets

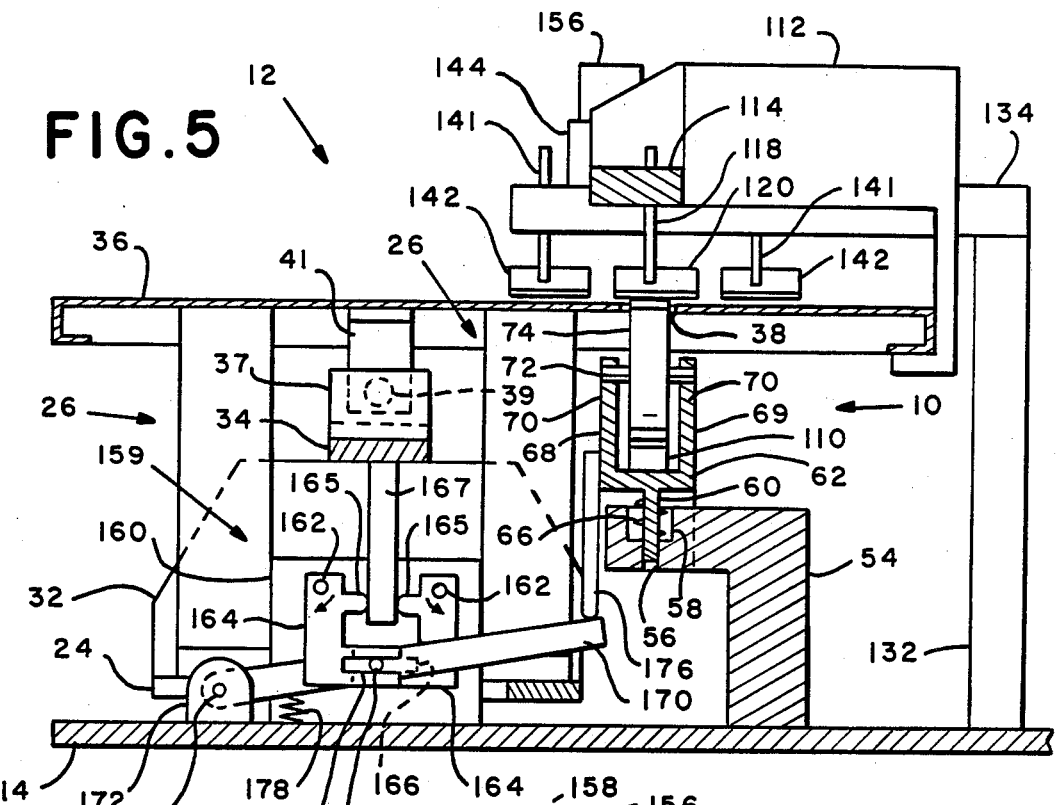
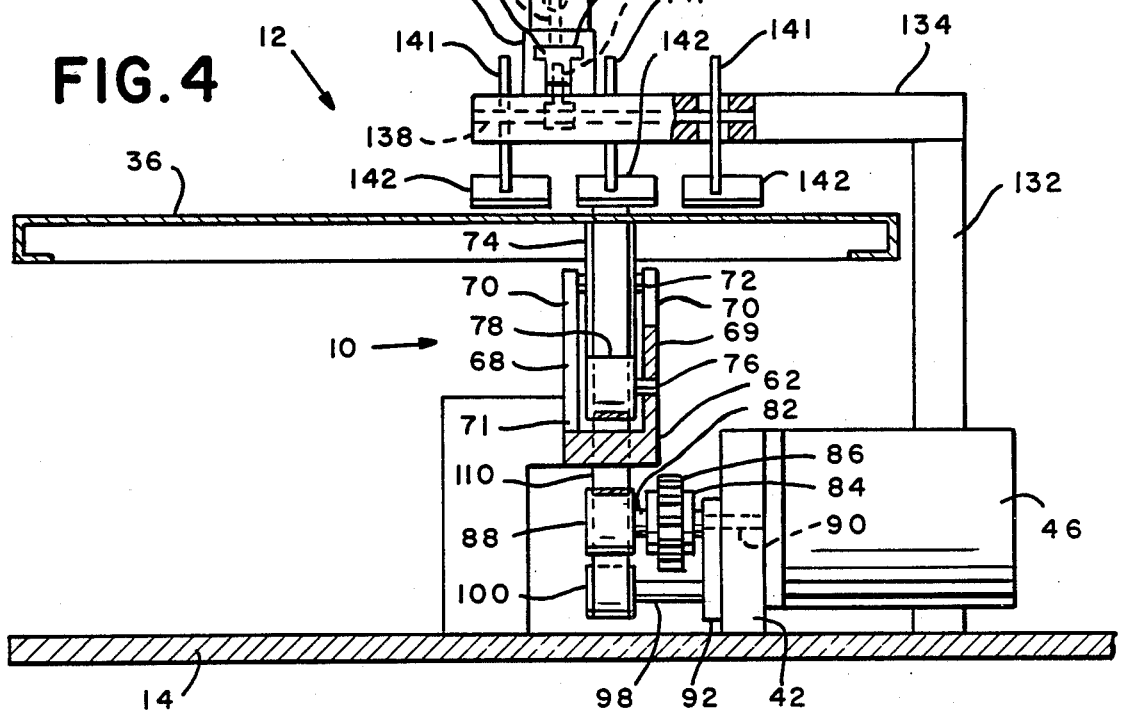

LOCKING MECHANISM FOR A WEIGHING SCALE TRAY

BACKGROUND OF THE INVENTION

As technology progresses, processes tend to proceed at a faster pace. Most processes require the coordination of a number of components, and a process can only proceed as fast as the slowest component allows unless multiple like components are used. There are certain processes in which the weight of an article is required, and great efforts have been made to obtain a scale that provides accurate, fast weighing. By accurate is meant the ability to weigh an object having a weight of up to 12 ounces within 1/32 of an ounce. By fast is meant the ability to weigh a stream of conveyed articles faster than one article per second. A process where there is a need for accurate, fast weighing is in the processing of mail. High speed systems have been developed whereby the appropriate number of inserts, which number may vary from envelope to envelope, are placed within an envelope. THe envelope is sealed and postage is printed on the envelope. Before the postage can be printed, however, it is necessary that the weight of the mail piece be determined.

In the past, weighing devices for such mail processing systems have been developed, but these generally have been rather slow. Actually, many prior weighing devices combined a standard scale with a mechanism that would stop the mail to allow weighing to take place.

Although these past weighing devices worked rather well with prior mail processing systems, with high speed inserters of contemporary design, the one function that had inhibited fast processing of mail was the weighing of mail pieces before postage is applied thereto. In order to overcome this problem, multiple scales would be used downstream from a high speed inserter and alternate mail pieces would be transported to such scales. Obviously, use of multiple scales is expensive and requires additional conveying apparatus that could result in a greater number of jams.

Certain prior high speed weighing devices employed to weigh articles that are part of a train of articles weighed each article while the scale was still in motion. See for example U.S. Pat. No. 3,800,893. The drawback to such a weighing system is that of expense. Still another scheme of fast weighing is to weigh a large number of articles simultaneously and obtain the average weight, but this is useless when the individual weight of each piece is required.

Recently a scale had been developed based on the principles of harmonic motion. Streams of articles can be transported individually unto the tray of the scale and the tray is caused to oscillate after an article has been placed on the tray. THe harmonic period of motion is measured and compared to a calibrated standard. Based on the comparison, the weight of the article is determined. The scale is referred to as a vibrating tray scale and is described in U.S. Pat. No. 4,778,018 and assigned to the assignee of the instant patent application.

Although the scale described in the U.S. Pat. No. 4,778,018 works well, it was found that improvement would be desirable in the locking mechanism for securing the tray of the scale while transporting articles onto the scale tray and during removal of an article following the weighing operation.

SUMMARY OF THE INVENTION

A locking mechanism for securing the tray of a vibrating tray scale during the transporting of flats, such as envelopes, onto and across the tray of the scale has been conceived. THE locking mechanism acts in unison with the flat transporting mechanism. When a flat is to be weighed, the locking mechanism releases the scale tray, so that it is free to vibrate, but after weighing, the locking mechanism once more securely holds the tray so that the flats can be removed therefrom. the locking mechanism is connected to the mechanisms that transports the flats across the tray so that locking occurs when the conveying mechanism is in a posture to transport flats. When the conveying mechanism is put into an inoperative mode, the locking mechanism will be released during the transition of the conveying mechanism from operative to inoperative so as to free the tray during the weighing step. When the conveying mechanism is again placed in the operative mode, it will cause the locking mechanism to once more secure the tray.

BRIEF DESCRIPTION OF THE DRAWING

FIG. 4 is a cross sectional view taken along the lines FIG. 4 of FIG. 1; and

FIG. 5 is a cross sectional view taken along the lines 5—5 of FIG. 1.

DETAILED DESCRIPTION OF THE INVENTION

Figure 1:
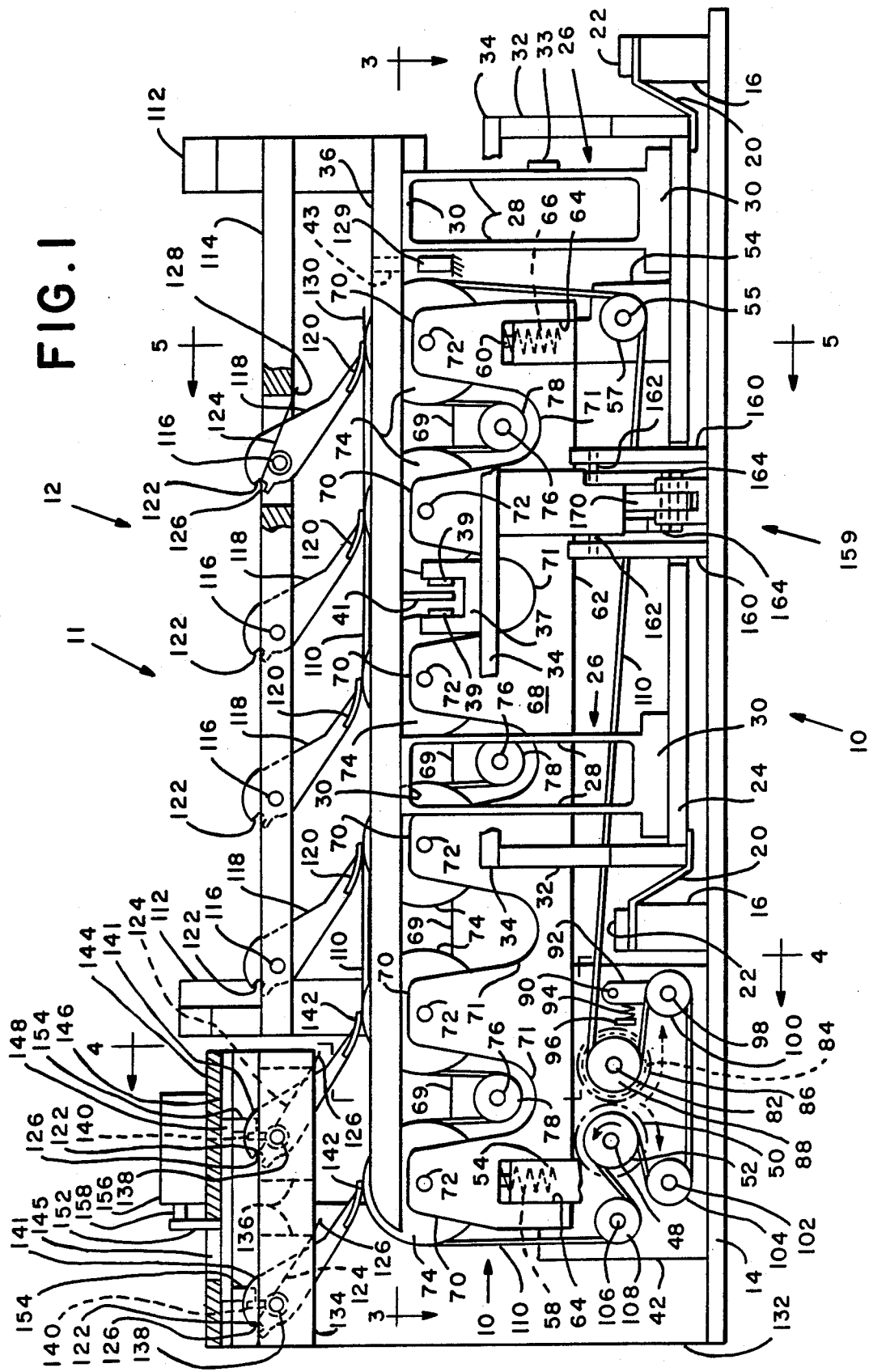
FIG. 1 is a side elevational view of an article conveying mechanism for a vibrating tray scale.
Figure 2:
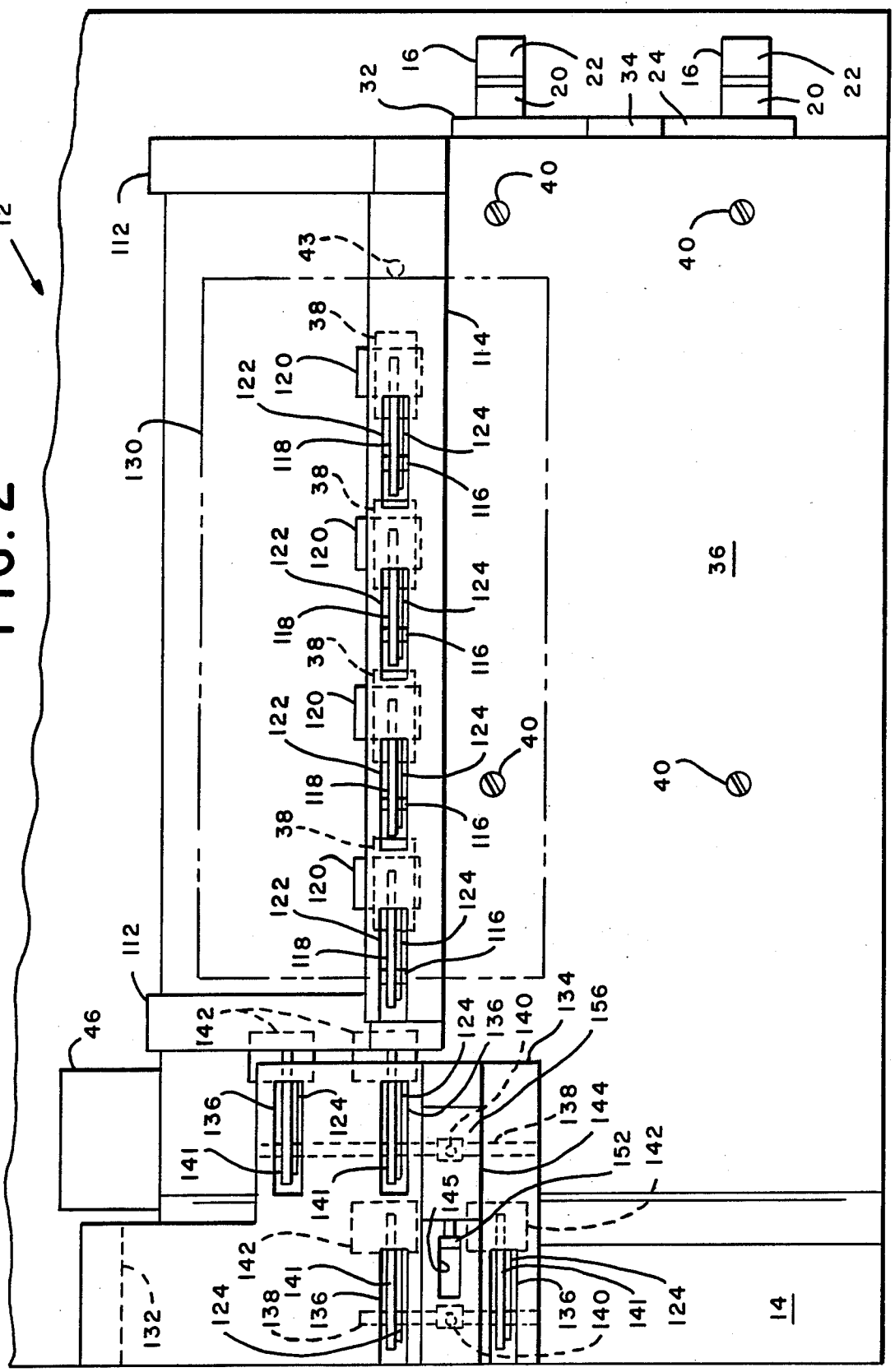
FIG. 2 is a plan view of the combination article conveying mechanism and weighing scale shown in FIG. 1.

With reference to FIGS. 1 and 2, a transport mechanism that incorporates the instant invention is shown generally at 10 and is used in conjunction with a scale 12 for the purpose of transporting flats, such as envelopes, across the scale as will be described hereinafter. A frame 14 supports four uprights 16. To each upright 16 a leaf spring 20 is attached by means of a cap 22 that can be bolted to the upright with a portion of the leaf spring held securely therebetween. It will be noticed that the leaf springs 20 are formed at an angle and have a lower portion that is attached, by any convenient manner such as by bolts or by welding, to a base 24. The angle of the leaf spring is preferably between approximately ½° and 15° relative to the vertical.

Secured to the base 24 ar four flexible members 26 made of a resilient material such as aluminum or steel and having a generally parallelogram configuration. Each flexible member 26 has a pair of opposed parallel flexible plates 28 joined together by integral connecting members 30. A transducer 33 is secured to at least one of the plates 28 of one of the flexible members 26. This transducer 33 may be a device such as a piezoelectric device such that a voltage is generated in accordance with the bending of the transducer. Also secured to the springs 20 and base 24 are a pair of opposed plates 32 that support a beam 34. A tray 36 is attached to the flexible members 26 in any conventional manner such as bolt 40, soldering or welding. The tray 40 has a number of longitudinally extending slots 38 therein, but it will be appreciated only one extended opening is acceptable. The tray 40 has an additional opening 43 located downstream from the slots 38.

An electromagnet 37 is supported by the beam 34 and receives an armature 41, made of electromagnetic material such as iron, that depends from the tray between the two poles 39 of the electromagnet.

Figure 3:
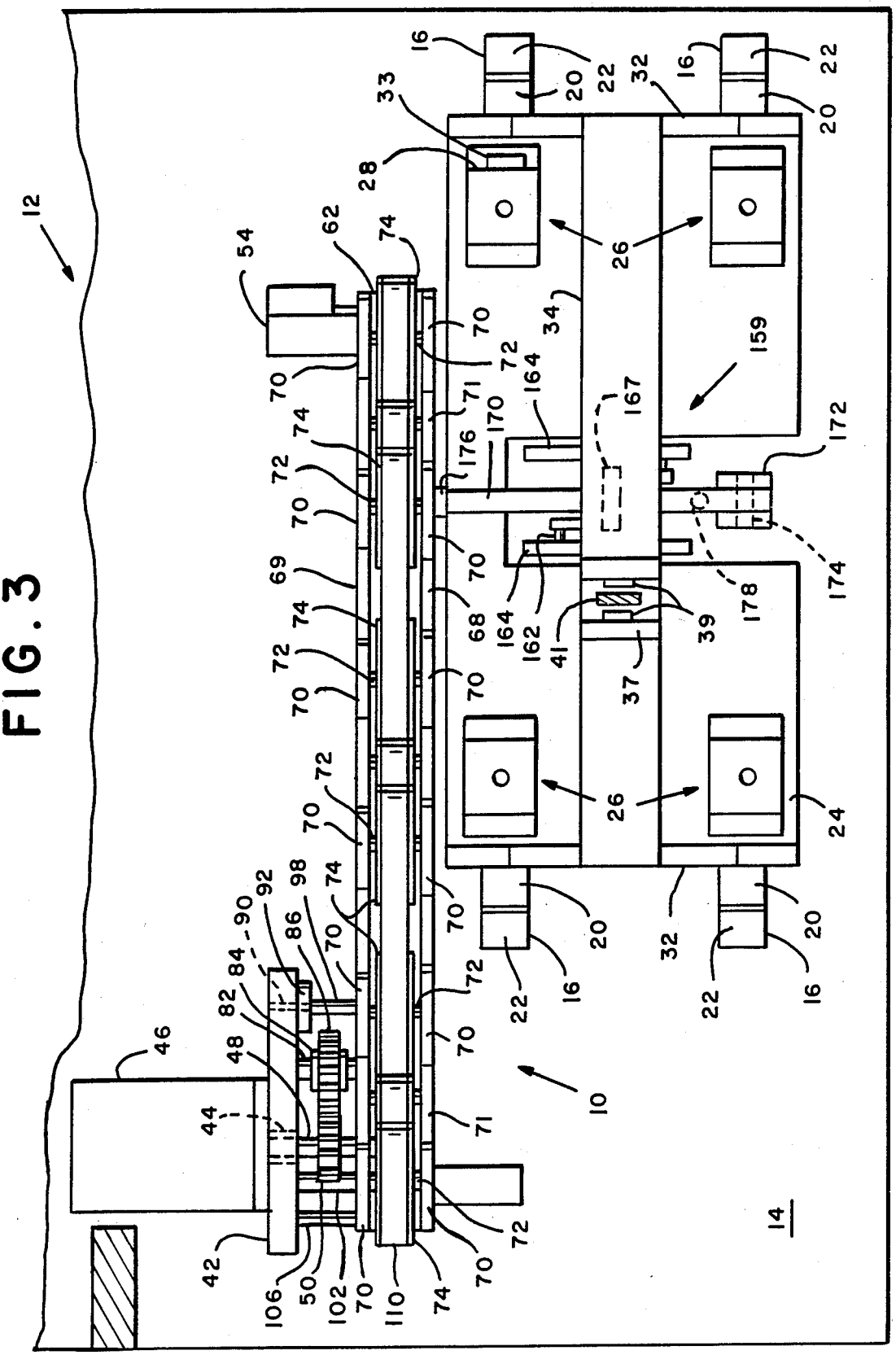
FIG. 3 is a cross sectional view taken along the lines 3—3 of FIG. 1.

Referring now to FIGS. 1 and 3, a bracket 42 is secured to the frame 14 and has an opening 44 therein. A reversible DC motor 46 is attached to the bracket 42, the output shaft of 48 of the motor being received within the opening 44. The motor 46 is operative to be rotated continuously in one direction and a selected amount, such as a single revolution in the other direction. Attached to the output shaft 48 are a gear 50 and a drive pulley 52.

Referring now to FIGS. 1 and 5, a bracket 54 has an opening 56 therein and a counterbore 58 located adjacent the opening 56. A pin 55 is supported by the bracket 54 and the pin has a pulley 57 rotatably mounted thereon. A finger 60 depends from a generally U-shaped carriage 62 and the finger is received within the opening 56 of the bracket 54. A coil spring 66 is mounted about the finger 60 intermediate the carriage 62 and counterbore 58 to urge the carriage away from the bracket 54. As seen in FIG. 1, the carriage 62 is elongated and has a pair of walls 68,69 with projections 70, the projections of the wall 68 addressing the viewer in FIG. 1, and valleys 71 for the purpose that will become clear hereinafter; whereas, the opposite wall 69 has projections but no valleys. A plurality of pins 72 is supported by the projections 70 of the carriage 62 and a roller 74 is rotatably mounted upon each pin 72. As seen in FIGS. 1, six rollers 74 are supported by the carriage 62. Three pins 76 area attached tot he wall 69 and rotatably support pulleys 78 thereon.

Referring to FIGS. 1, 2 and 4, a pin 82 is supported by the bracket 42 and has mounted thereon a one way clutch 84 about which is mounted a gear 86, the gear 86 meshing with the motor gear 50. An idler pulley 88 is rotatably supported by the pin 82. Another pin 90 is supported by the bracket 42 and has rotatably mounted thereon a pivot arm 92. A spring 94 is attached to the pivot arm 92 and supported by a mounting 96 that is attached to the bracket 42. In this manner the pivot arm 92 is urged by the spring 94 in a counter clockwise direction as seen in FIG. 1. A pin 98 is located on the end of the pivot arm 92 distal from the pin 90 and has an idler pulley 100 rotatably mounted thereon. Another pin 102 is supported by the bracket 42 and has an idler pulley 104 rotatably mounted thereon. Still another pin 106 is mounted on the bracket 42 and has an idler pulley 108 supported thereon. A belt 110 is trained about the rollers 74 and the pulleys 52, 57,78,88,98,104,108 in a serpentine fashion. It will be noted that the belt 110 is trained about a first roller 74 and a pulley 78 and then extends from a second roller to a third roller 74 before being trained about another pulley 78, and then once more extends from the fourth and fifth rollers 74 before being trained about the other pulley 78, and finally trained about the sixth roller 74. The reason for having this particular configuration of the belt is for the purpose of reducing wear of the belt. Having the belt extending laterally to two adjacent rollers 74 has been found to substantially reduce the wear of the belt as opposed to having the belt train alternatively about combinations of rollers 74 and pulleys 78 throughout.

With reference to FIGS. 1 and 5 a pair of generally C-shaped supports 112 are attached to the tray 36 at opposite longitudinal ends thereof and support a bar 114 that extends longitudinally above the tray 36. The bar 114 has a number of pins 116 mounted thereon each pin supporting an arm 118. Each arm 118 has a paddle 120 at one end and a notch 122 at its other end. A spring 124 is mounted upon each pin 116 and has one tang 26 received within the notch 122 of an arm 118 and another tang 128 in engagement with the underside of the bar 114. This spring 124 provides a biasing force against the arms 118 that urges the paddles 120 into engagement with the portion of the belt 110 that is trained about the rollers 74 or into engagement with a flat 130 being transported across the tray 36. The paddles 120 are laterally larger than the lots 38 in the tray 36 thereby preventing the arms from falling into the slots when the rollers 74 are removed as will hereinafter be described. Supported by the frame 14 by any convenient manner is a photodetector unit 125 that directs lights into the opening 43 and senses reflected light when an object such as a flat is on the tray 36.

With reference to FIGS. 1, 2 and 4, a wall 132 has a plate 134 mounted thereon, the plate 134 having four slots 136 therein. A pair of shafts 138,140 are supported by the plate 134 so as to be received within and extend across the slots 136. A pin 140 is attached to each of the shafts 138 and a pair of arms 141 is attached to each of the shafts 138. It will be noted that two of the arms 141 are in longitudinal alignment with the arms 118 while the other two arms 141 are off-set.

Each of the arms 141 has a paddle 142 that is directed towards an associated roller 74 by one of the arms and toward the plate 134 by the other three arms by a combination of spring 124 notch 122 and tangs 126,128 as described previously with respect to the other arms 118. A channel member 144 is supported by the plate 134 and has an opening 145 therein, as well as a T-shaped channel 146 that receives a generally T-shaped slide 148 that has a pusher 152 extending therefrom which is received within the opening 145. a pair of fingers 154 depend from the T-shaped slide 148 and are engageable with the pins 140. A solenoid 156 is supported by the channel member 144, the push rod 158 of the solenoid engaging the pusher 152.

Referring now to FIGS. 1 and 5, a locking mechanism is shown generally at 159 and includes a bracket 160 that is supported by the frame 14 and has a pair of pins 162 extending therefrom. A generally L-shaped arm 164 is pivotally mounted on each pin 62, each of the L-shaped arms 164 having a projection 165, the two projections extending towards one another and paced from one another. The ends of the L-shaped arms each has a slot 166 therein. A finger 167 depends from the beam 34, see FIG. 3, to be received between the two projections 165. A pin 168 is received within the arm slots 166, the pin being secured to a lever 170 that is rotatably supported by a pin 174 attached to a stanchion 172. The stanchion 172 is secured to the frame 14. A pusher 176 is fixed to the carriage 62 and a compression spring 178 is attached, by any convenient manner, to the frame 14 at one of its ends and engages the lever 170 at its other end so as to urge the lever towards the pusher 176.

Figure 6:
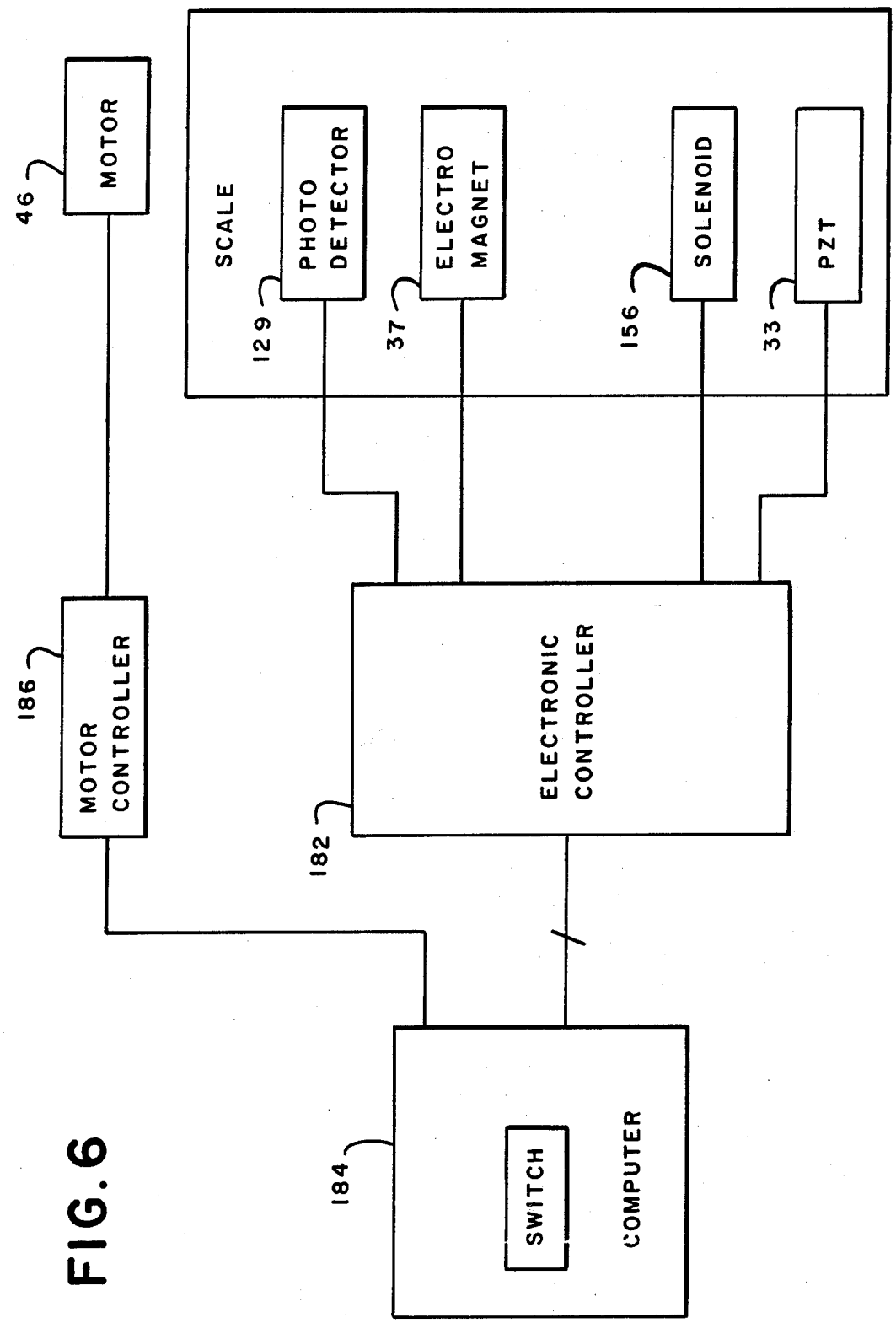
FIG. 6 is a block diagram of the control circuit for the combination conveying mechanism and scale shown in FIG. 1-5.

With reference to FIG. 6, the circuitry for the combination scale and and transporting mechanism includes an electronic controller 182 that is in communication with a computer 184 as well as the photodetector unit 125, the PZT 33 and the electromagnet 37. The computer 34 in turn is connected to a motor controller 186 which in turn is connected to the motor 46 to control drive of the latter upon receiving instruction from the computer.

In operation, when a flat 130, such as an envelope, is to be conveyed by the transport mechanism 10 onto and across the tray 36 of the scale 12, it is initially placed by a convenient method between the rollers 74 on the left side of the mechanism as seen in FIG. 1, and two of the paddles 142 of the arms 141 and between the tray 130 and two of the paddles 142. The presence of the additional arms 141 is for guiding the flat 130 onto the tray 36 and providing linkage with an upstream module or device or they serve the function of sealing the flap of an envelope as described in co-pending patent application having Ser. No. 291,097. It will be appreciated that the motor 46 is operated so as to rotate the pulley 52 continuously in the counter clockwise direction as seen in FIG. 1, and the pulley 88 will perform as an idler pulley to rotate in a counter clockwise direction because the one way clutch 84 is not engaged under these circumstances. As the pulley 52 is rotated in the counter clockwise direction, the endless belt 110 will cause the rollers 74 to rotate in the clockwise direction so that the belt has the movement at the top of the rollers 74 from left to right as seen in FIG. 1. It will be appreciated all the idler pulleys 57,78,98,104, and 108 will be driven as well. The flat 130 is placed between the paddles 142 and the belt 110 driven to the paddles 120 and will be conveyed across the tray 36 until the leading edge of the flat is located above the photodetector unit 129 where it will be sensed. As a result of this sensing, the motor 36 will be disabled, thereby discontinuing the drive to the belt 110 and the motor will be enabled for reverse drive for a single revolution. As the shaft 48 is rotated in the clockwise direction, as seen in FIG. 1, the gear 50 will drive the gear 86 and the one way clutch 84 will engage the shaft 82 to cause the pulley 88 to rotate in the same direction, i.e. counter clockwise. With the pulley 88 driven in the counter clockwise direction and the pulley 52 driven in the clockwise direction, the belt 110 will be pulled inwardly by the two pulleys 52,88 as indicated by the dotted arrows in FIG. 1 so as to place a force upon the rollers 74. This will cause the carriage 62 to be pulled downwardly against the spring 66 until the rollers 74 lose contact with the flat 130, i.e., below the surface of the tray 36. A the belt 110 is pulled downwardly by the two pulleys 52,88, the spring 94 will act upon the lever 92 to cause the pulley 100 to be moved away from the pulley 104 to take up the slack in the belt 110 caused by the action of the pulleys 52,88 that results in a new location of the carriage 62.

With the carriage 62 pulled in the downwardly position, the solenoid 156 will be actuated so that the ram 158 pushes the pusher 152 to the left as seen in FIG. 1 whereby the fingers 154 will contact the pins 140 to cause the arms 141 to pivot about the shafts 138.

While the above is occurring, the tray 36 will be in a locked position by virtue of the projections 165 being in contact with the finger 167 that depends from the tray 36, see FIG. 5. A the motor 46 is reverse driven to causes the belt 110 to pull the carriage 62 downwardly and overcome the springs 58, the pusher 176 will act upon the lever 170 causing the pin 68 to be moved in a clockwise direction, virtually vertically, downwardly, thereby causing the brackets 160 to rotate as indicated by the arrows in FIG. 5. As the arms 164 rotate, the projections 165 are withdrawn from the finger 167 thereby unlocking the tray 136. One of the advantages of the locking mechanism 159 is that it cooperates with the movement of the carriage 62 to assure coordination between the two.

Upon the tray being unlocked, the electromagnetic 37 will be activated thereby causing the armature 41 to be attracted by one of the poles 39 of the electromagnet and repulsed by the other pole thereby giving the tray an impulse that causes vibration of the tray and bending of the flexible members 26. As the flexible members 26 are flexed as a result of the impulse to the tray 36, the transducer 32 will be repeatedly bent and emit a signal representing simple harmonic motion of the tray. Based upon the zero zero frequency crossings, the weight of the object on the tray can be determined. The details as to how the scale 12 obtains the weight from the simple harmonic motion of the tray is fully explained U.S. Pat. No. 4,778,018, supra, and for that reason the principle of weight determination will not be described herein. With the weight being determined by the computer 184, the computer will then give instructions to the motor controller 186 and the solenoid 156, as will be described.

After the weight has been obtained, the motor 46 is caused to be driven in the drive direction such that the pulley 52 will once more be rotated continuously in the counter clockwise direction. As this occurs, the gear 50 causes gear 86 to rotate in the clockwise direction, which is the direction in which the one way clutch provides no drive to the shaft 82 thereby causing the pulley 88 to be idle, i.e., free wheeling. This will result in the belt 110 being driven in the clockwise direction so that that portion of the belt trained about the pulleys 52,88,100 and 102 will be pulled inwardly to contract, and the spring 66 will urge the carriage 62 upwardly.

As the carriage is raised, as described above, the plunger 176 will be moved away from the lever 170 thereby allowing the spring 178 to drive the lever in a counter clockwise direction. As the lever 170 thus moves in a counter clockwise direction, the pin 168 within the slots 166 will cause the arms 164 to move in a direction opposite to the arrows shown in FIG. 5 thereby bringing the projections 165 into contact with the finger 167 and lock the tray 36 once more. Simultaneously, the solenoid 156 will be deactivated, thereby removing the plunger 158 from contact with the pusher 152 thereby allowing the springs 124 to rotate the arms 141 in a clockwise direction, thus pushing the T-shaped slide to the right as seen in FIG. 1 and causing the paddles 142 to engage the belt or tray 36. In this state the transporting apparatus is ready to remove a flat that has been weighed and transport another flat onto the tray 136. Such removal is accomplished by the motor 46 being enabled to drive the belt 110 in the counterclockwise direction.

Thus, what has been shown and described in a locking mechanism 159 that cooperates with a transporting mechanism 10 whereby flats transported onto and from the t ray 36 of a scale with the tray secured but the tray will be released when the flat is in the weighing position so that the tray can be vibrated. The weight of the flat can then be determined by the frequency of oscillation of the tray.

What is claimed is:

1. A locking mechanism for a vibrating tray scale of the type having a frame, a tray, springs resiliently connecting the tray to the frame, and a transporting mechanism for transporting articles onto and across the tray, the transporting mechanism having an operative mode and an inoperative mode, the combination comprising:

a bracket supported by said frame, a pair of arms pivotally supported by said bracket, a finger secured to and depending from said tray, said finger being received between said arms and pivot means for causing said arms to engage said finger when said transporting mechanism is in said inoperative mode and for causing said arms to disengage from said finger when said transporting mechanism is in said operative mode.

2. The locking mechanism of claim 1 wherein each of said arms has projections, said projections addressing one another and contacting said finger when said transporting mechanism is in said operative mode.

3. The locking mechanism of claim 1 wherein each of said arms has a slot therein, and said pivot means includes a lever pivotally attached to said frame, a pin secured to said lever and received within said slots, and means connecting said lever to said transporting mechanism whereby said lever will be pivoted to cause said arms to disengage from said finger when said transporting mechanism goes from its operative mode to said inoperative mode and said lever will be pivoted to cause said arms to engage said finger when said transporting mechanism goes from said inopeative mode to said operative mode.

4. The locking mechanism of claim 3 wherein said means for connecting said lever to said transporting means is a pusher connected to said transporting means and including means for directing said pusher against said lever when said transporting mechanism becomes inoperative.

5. A locking mechanism for a vibrating tray scale of the type having a frame, a tray having at least one opening therein and hold down members thereon to secure flats to said tray, springs resiliently connecting the tray to the frame, and a transporting mechanism for transporting articles onto and across the tray, the combination comprising:

a bracket supported by said frame, a pair of arms pivotally supported by said bracket, a finger secured to and depending from said tray, said finger being received between said arms, pivot means for causing said arms to engage said finger when in a first mode and for causing said arms to disengage from said finger when in a second mode, said transporting mechanism having a carriage resiliently supported by said frame with a plurality of rollers that are receivable within said at least one opening and in registration with said flats hold down members, means for moving said carriage to overcome said resilient means and remove said rollers from said at least one opening, and means connecting said carriage to said pivot means, whereby, upon said moving means removing said rollers from said at least one opening, said connecting means will put said pivot means into said second mode to cause said arms to disengage from said finger.

6. The locking mechanism of claim 5 wherein each of said arms has projections, said projections addressing one another and contacting said finger when said pivot means is in said first mode.

7. The locking mechanism of claim 5 wherein each of said arms has a slot therein, and said pivot means includes a lever pivotally attached to said frame, a pin secured to said lever and received within said slots, and means connecting said lever to said carriage whereby said lever will be pivoted to cause said arms to disengage from said finger when said moving means overcomes said resilient means to remove said rollers from said at least one opening and said lever will be pivoted to cause said arms to engage said finger when said carriage is moved by said resilient means to have said rollers received within said at least one opening.

8. The locking mechanism of claim 7 wherein said means for connecting said lever to said transporting means is a pusher connected to said carriage and including means for directing said pusher against said lever when said carriage is moved by said moving means.

* * * * *